(12) United States Patent
Jungqvist et al.

(10) Patent No.: US 9,105,374 B2
(45) Date of Patent: Aug. 11, 2015

(54) FLAME RETARDANT POLYMER COMPOSITION COMPRISING AN ETHYLENE COPOLYMER WITH MALEIC ANHYDRIDE UNITS AS COUPLING AGENT

(75) Inventors: Jonas Jungqvist, Stenungsund (SE); Wendy Loyens, Stenungsund (SE)

(73) Assignee: BOREALIS AG, Vienna (AT)

( * ) Notice: Subject to any disclaimer, the term of this patent is extended or adjusted under 35 U.S.C. 154(b) by 375 days.

(21) Appl. No.: 13/318,562

(22) PCT Filed: Apr. 22, 2010

(86) PCT No.: PCT/EP2010/002483
§ 371 (c)(1),
(2), (4) Date: Dec. 20, 2011

(87) PCT Pub. No.: WO2010/142362
PCT Pub. Date: Dec. 16, 2010

(65) Prior Publication Data
US 2012/0101208 A1    Apr. 26, 2012

(30) Foreign Application Priority Data

Jun. 10, 2009   (EP) .................................. 09007697

(51) Int. Cl.
| C08L 23/08 | (2006.01) |
| C08K 3/22 | (2006.01) |
| H01B 7/295 | (2006.01) |
| H01B 3/44 | (2006.01) |
| C08L 51/06 | (2006.01) |

(52) U.S. Cl.
CPC ............ *H01B 7/295* (2013.01); *C08L 23/0869* (2013.01); *H01B 3/441* (2013.01); *H01B 3/447* (2013.01); *C08L 51/06* (2013.01); *C08L 2201/02* (2013.01)

(58) Field of Classification Search
None
See application file for complete search history.

(56) References Cited

U.S. PATENT DOCUMENTS

| 5,523,355 A | 6/1996 | Oba et al. |
| 5,707,732 A | 1/1998 | Sonoda et al. |
| 2005/0137306 A1 | 6/2005 | Hausmann et al. |

| 2010/0143651 A1 * | 6/2010 | Silvis et al. ................... 428/141 |
| 2013/0059989 A1 * | 3/2013 | Ansems et al. ............. 525/92 C |
| 2013/0112270 A1 * | 5/2013 | Patel et al. .................... 136/259 |

FOREIGN PATENT DOCUMENTS

| CN | 1074454 | 7/1993 |
| EP | 0 270 924 | 6/1988 |
| EP | 0 393 959 | 10/1995 |
| EP | 0546841 | 3/1998 |
| EP | 1 655 741 | 5/2006 |
| EP | 1 863 041 | 12/2007 |
| EP | 2 072 572 | 6/2009 |
| EP | 2 072 573 | 6/2009 |
| WO | WO 93/19118 | 9/1993 |
| WO | WO 2008/112393 | 9/2008 |
| WO | WO 2008112393 A1 * | 9/2008 |
| WO | WO 2009080350 A1 * | 7/2009 |
| WO | WO 2010/033396 | 3/2010 |

OTHER PUBLICATIONS

Amplify GR-216 Data Sheet (2013).*
Almatis Hydral Series Aluminum Trihydroxides Product Sheet (2003).*
International Search Report mailed Nov. 23, 2010 for International application No. PCT/EP2010/002483.
Written Opinion mailed Nov. 23, 2010 for International application No. PCT/EP2010/002483.
Engineered Materials/J.M. Huber Corporation's letter to The Dow Chemical Company dated Aug. 13, 2012.
Haslam, J. et al., *Identification and Analysis of Plastics*, $2^{nd}$ Edition, London, England, Iliffe Books, 1972.

* cited by examiner

*Primary Examiner* — Ling Choi
*Assistant Examiner* — Catherine S Branch
(74) *Attorney, Agent, or Firm* — Fay Sharpe LLP

(57) ABSTRACT

The present invention relates to a flame retardant polymer composition comprising (A) an ethylene copolymer comprising alkyl acrylate comonomer units, (B) uncoated aluminum hydroxide as inorganic filler, and (C) an ethylene copolymer comprising maleic anhydride units in an amount of 0.6 to 5 wt. %, an article comprising such a composition, the use of such a composition for producing a layer in a wire or cable and the use of an ethylene copolymer comprising maleic anhydride units for producing a wire or cable fulfilling the requirements of class D of the FIPEC test according to prEN 50399:2007./.

12 Claims, No Drawings

FLAME RETARDANT POLYMER COMPOSITION COMPRISING AN ETHYLENE COPOLYMER WITH MALEIC ANHYDRIDE UNITS AS COUPLING AGENT

The present invention relates to a flame retardant polymer composition comprising an ethylene copolymer with maleic anhydride units as coupling agent, an article comprising said flame retardant polymer composition and the use of said coupling agent for producing a wire or cable with improved flame retardancy.

For improving the flame retardancy of polymers, several approaches are known in the art. First, it is known to include compounds containing halides into the polymer. However, these materials have the disadvantage that upon burning hazardous and corrosives gases like hydrogen halides are deliberated. This is also a disadvantage of flame retardant polymer composition based on PVC.

In a further approach, flame retardant compositions include relatively large amounts, typically 50 to 60 wt. %, of inorganic fillers such as e.g. hydrated and hydroxy compounds, which during burning decompose endothermically and deliberate inert gases at temperatures in the range of 200 to 600° C. Such inorganic fillers e.g. include $Al(OH)_3$ and $Mg(OH)_2$. However, these flame retardant materials suffer from the deterioration of the processability and mechanical properties of the polymer composition due to the high amount of filler.

A third approach as disclosed e.g. in EP 0 393 959 uses a silicon fluid or gum in a composition together with an organic polymer comprising an acrylate or acetate and an inorganic filler which is neither a hydroxide nor a substantially hydrated compound. The flame retardancy of such compositions is based on synergistic effects between these three components which in case of burning lead to the formation of a physically and firmly stable char layer that protects the polymer from further burning. Compounds based on such compositions show good flame retardancy in the limiting oxygen index (LOI) test method according to ISO 4589-A-IV. Sheathed cables and larger conduit (unsheathed) cables also fulfill specific cable tests, like e.g. the single-wire burning test according to IEC 332-1. Cables and wires, however, based on such compositions have difficulties in fulfilling the requirements of bunch tests, e.g. FIPEC test according to prEN 50399:2007. Hence, the flame retardancy of such compositions can still be improved.

It is thus object of the present invention to overcome the drawbacks of the prior art and to provide a cost effective flame retardant polymer composition which shows a combination of good flame retardancy i.e. passes the FIPEC test according to prEN 50399:2007, good processability, such as extrudability, and good mechanical properties, such as tensile properties as well as good economics.

It has surprisingly been found that the object of the present invention can be achieved by adding an ethylene copolymer comprising at least 0.6 wt. % maleic anhydride units as coupling agent to a flame retardant polymer composition comprising a more cost effective uncoated aluminum hydroxide as filler material. The polar maleic anhydride units in the ethylene copolymer assure the compatibility between the polymer base resin and the uncoated inorganic filler material and thus improve the distribution of the latter in the final composition.

The invention therefore relates to a flame retardant polymer composition comprising
(A) an ethylene copolymer comprising alkyl acrylate comonomer units,
(B) uncoated aluminum hydroxide as inorganic filler, and
(C) an ethylene copolymer comprising maleic anhydride units in an amount of 0.6 to 5 wt. %.

The flame retardant polymer composition according to the invention preferably fulfills the requirements of class D, more preferably of class C and even more preferably of class B2 of the FIPEC test according to prEN 50399:2007 when being used as a layer in a cable and further shows good processability, such as extrudability, and good mechanical properties, such as good tensile properties. The fire classification is done according to the classification table published in the Official Journal of the European Union, published Apr. 11, 2006: Commission Decision of 27 Oct. 2006 amending Decision 2000/147/EC implementing Council Directive 89/106/EEC as regards the classification of the reaction-to-fire performance of construction products.

Preferably, the composition is free of halogen- and phosphorous-containing compounds as flame retardancy aids, i.e. such compounds, if at all, are present in the composition in an amount of below 3000 ppm.

More preferably, the composition is entirely free of halogen-containing compounds. However, especially phosphorous containing-compounds may be present in the composition as stabilizers, usually in an amount of below 2000 ppm, more preferably below 1000 ppm.

In the composition, components (A), (B), (C) and optionally (D) as described below may either consist of a single chemical compound or a mixture of compounds of the required type.

It is preferred that the polymeric components (A), (B), and optionally (D) of the flame retardant composition are different from each other. "Being different" means that the two (or three) polymers differ as to at least one property.

Furthermore, wherever herein the term "polyolefin" (or "polyethylene") is used both olefin homo or copolymers (or ethylene homo- or copolymers) are meant.

The term "copolymer" as used herein is meant to include copolymers produced by copolymerization or by grafting of monomers onto a polymer backbone.

The inventive flame retardant polymer composition comprises an ethylene copolymer comprising maleic anhydride units in an amount of 0.6 to 5 wt. %.

The amount of maleic anhydride units in ethylene copolymer (C) is meant to refer to the amount of monomeric maleic anhydride units which form part of copolymer (C). Those maleic anhydride units may be incorporated into the ethylene copolymer (C) by means of copolymerization or grafting.

Preferably, the amount of maleic anhydride units in component (C) is from 0.6 to 4 wt. %, more preferably from 0.7 to 3.5 wt. %.

It is preferred that component (C) is present in the flame retardant polymer composition in an amount of up to 15 wt. %, more preferably in an amount of 1 to 10 wt. %, and most preferably in an amount of 2.0 to 7.5 wt. % of the total composition.

Component (C) preferably has a melt flow rate MFR (190° C., 2.16 kg) of 0.1 to 10 g/10 min, more preferably of of 0.5 to 8 g/10 min, and most preferably of 1.0 to 7 g/10 min.

Further, component (C) preferably has a density of not more than 960 $kg/m^3$, more preferably of 910 to 955 $kg/m^3$ and still more preferably of 920 to 940 $kg/m^3$, and most preferably of 925 to 935 $kg/m^3$.

Component (C) may be produced by means of copolymerization of ethylene and maleic anhydride units, and optionally further comonomer units or by grafting the maleic anhydride units onto an ethylene homo- or copolymer backbone.

In one embodiment, maleic anhydride units are grafted onto an ethylene homo- or copolymer backbone. Suitable ethylene homo- or copolymers include low density polyethylene, linear low, medium or high density polyethylene and very low density polyethylene. Preferred are linear low density polyethylene and high density polyethylene, and mostly preferred is linear low density polyethylene.

In this embodiment, the maleic anhydride grafted ethylene copolymer preferably has a melt flow rate MFR (190° C., 2.16 kg) of 0.1 to 5.0 g/10 min, more preferably of of 0.5 to 4.0 g/10 min, and most preferably of 1.0 to 2.5 g/10 min.

In another embodiment, component (C) is produced by copolymerization of ethylene and maleic anhydride units, and optionally further comonomer units.

In addition to ethylene and maleic anhydride the copolymerized ethylene copolymer of this embodiment may further comprise additional comonomers in an amount of up to 30 wt. %, more preferably in an amount of 5 to 25 wt. %. These comonomers may be selected from but are not limited to $C_3$- to $C_{20}$-alpha-olefins, $C_1$- to $C_6$-alkyl(meth)acrylates, acrylic acids, methacrylic acids and vinyl acetates.

The copolymerized ethylene copolymer preferably has a melt flow rate $MFR_2$ (190° C., 2.16 kg) of 0.5 to 10.0 g/10 min, more preferably of of 1.0 to 9.0 g/10 min, and most preferably of 3.0 to 8.0 g/10 min.

The inventive flame retardant polymer composition comprises a polar ethylene copolymer comprising alkyl acrylate comonomer units.

Preferably, the alkyl acrylates are selected from $C_1$- to $C_6$-alkyl acrylates, more preferably the alkyl acrylates are selected from $C_1$- to $C_4$-alkyl acrylates and most preferably the alkyl acrylates are methyl acrylate comonomers and most preferably, component (A) is an ethylene methacrylate copolymer.

Preferably, component (A) has an alkyl acrylate content from 10 to 40 wt. %, more preferably from 15 to 35 wt. % and most preferably from 20 to 30 wt. %.

In addition to alkyl acrylate comonomers component (A) may further comprise additional comonomers. These comonomers may be selected from but are not limited to $C_3$- to $C_{20}$-alpha-olefins, $C_1$- to $C_6$-alkyl methacrylates, acrylic acids, methacrylic acids and vinyl acetates. Component (A) may also contain ionomeric structures (like e.g. DuPont's Surlyn type).

In addition to ethylene and the defined comonomers, the copolymers can also contain additional monomers.

Preferably, component (A) is an ethylene copolymer comprising not more than 5 wt. % of comonomers other than alkyl acrylates, more preferably not more than 2.5 wt. % of comonomers other than alkyl acrylates, even more preferably not more than 1.0 wt. % of comonomers other than alkyl acrylates and most preferably not more than 0.5 wt. % of comonomers other than alkyl acrylates.

In the composition of the invention, preferably the amount of component (A) is from 10 to 50 wt. % of the total polymer composition, more preferably is from 15 to 40 wt. % of the total polymer composition and most preferably is from 25 to 35 wt. % of the total polymer composition.

Preferably component (A) has a density of at least 940 kg/m$^3$, more preferably of 942 to 960 kg/m$^3$.

The inventive flame retardant polymer composition comprises uncoated aluminum hydroxide as inorganic filler material.

Preferably, the aluminum hydroxide used in component (B) has a specific surface area (BET) of 3.0 m$^2$/g or higher, more preferably of 3.5 m$^2$/g or higher, even more preferably of 3.8 m$^2$/g or higher and most preferably of 4.0 m$^2$/g or higher.

Further, preferably the amount of component (B) is from 40 to 70 wt. % of the total polymer composition, more preferably from 50 to 70 wt. % of the total polymer composition, even more preferably from 55 to 65 wt. % of the total polymer composition and most preferably from 57 to 63 wt. % of the total polymer composition.

The flame retardant polymer composition may optionally further comprise
(D) a polymer selected from the group of polyolefins, polyesters, polyethers, polyurethanes, elastomeric polymers and silane-crosslinkable polymers or mixtures thereof in a total amount of up to 25 wt. % of the total polymer composition.

Preferably component (D) is present in an amount of 2.0 to 20 wt. %, more preferably component (D) is present in an amount of 3.0 to 18 wt. %, even more preferably component (D) is present in an amount of 5.0 to 15 wt. % and most preferably component (D) is present in an amount of 8.0 to 12 wt. % of the total polymer composition.

The polyolefins comprised in component (D) may be homopolymers or copolymers of ethylene, propylene and butene and polymers of butadiene or isoprene. Suitable homopolymers and copolymers of ethylene include low density polyethylene, linear low, medium or high density polyethylene and very low density polyethylene.

The elastomeric polymers comprised in component (D) may be ethylene/propylene rubber (EPR), ethylene/propylene-diene monomer rubbers (EPDN), thermoplastic elastomer rubber (TPE) and acrylonitrile butadiene rubber (NBR).

Silane-crosslinkable polymers may also be comprised in component (D), i.e. polymers prepared using unsaturated silane monomers having hydrolysable groups capable of crosslinking by hydrolysis and condensation to form silanol groups in the presence of water and, optionally, a silanol condensation catalyst.

Preferably, component (D) is an ethylene homopolymer, more preferably component (D) is a high density ethylene homopolymer with a density of 944 kg/m$^3$ or more, more preferably 950 kg/m$^3$ or more and most preferably 955 kg/m$^3$ or more.

In addition to the above described components, the inventive compositions may also contain additional conventional additives such as, for example, antioxidants or UV stabilizers in small amounts. Said additives are usually present in an amount of not more than 5.0 wt. %, preferably not more than 3.0 wt. % and more preferably not more than 1.0 wt. %.

The flame retardant polymer composition according to the invention may be prepared by mixing together the components by using any suitable means such as conventional compounding or blending apparatus, e.g. a Banbury Mixer, a 2-roll rubber mill or a twin screw extruder, Buss co-kneader, etc.

Generally, the composition will be prepared by blending the components together at a temperature which is sufficiently high to soften and plasticise the organic polymer, typically at a temperature in the range of 120 to 200° C.

The flame retardant polymer composition of the present invention shows good mechanical properties.

Preferably, the flame retardant polymer composition has a tensile strength of at least 7 MPa, more preferably of at least 9 MPa, and most preferably of at least 11 MPa, measured according to ISO 527-2.

Further, the flame retardant polymer composition preferably shows an elongation at break of at least 120%, more preferably of at least 140% and most preferably of at least 160%, measured according to ISO 527-2.

Additionally, the flame retardant polymer composition of the present invention shows good flame retardancy in the LOI test according to ISO 4589-2 by preferably having a value higher than 28%, more preferably higher than 30%.

The flame retardant compositions according to the present invention may be used in many and diverse applications and products. The compositions can for example be molded, extruded or otherwise formed into moldings, sheets and fibers.

A particularly preferred use of the flame retardant compositions is for the manufacture of wire and cables. The compositions can be extruded about a wire or a cable to form an insulating or jacketing layer or can be used as bedding compounds.

The present invention thus also relates to an article comprising the flame retardant polymer composition of any of the above described embodiments. Preferably, the inventive article is a wire or cable, comprising a layer as described above made of the inventive flame retardant polymer composition.

Further, the present invention relates to the use of the inventive flame retardant polymer composition for producing such a layer in a wire or cable.

Additionally, the present invention relates to the use of an ethylene copolymer comprising maleic anhydride units, for producing a wire or cable fulfilling the requirements of class D, more preferably of class C and even more preferably of class $B_2$ of the FIPEC test according to prEN 50399:2007.

Preferably, the ethylene copolymer comprising maleic anhydride units is that according to any embodiment of component (C) of the flame retardant polymer composition as described above.

The cable may be a power cable, such as an extra high voltage, a high voltage, a medium voltage or a low voltage cable, or a telecommunication cable.

In the present invention, the flame retardancy of the cable is determined according to the European Fire class of cables, also called European project "FIPEC". The cable is tested in "real life" scenarios. There are two distinct scenarios, one vertical and one horizontal scenario. A description of these test scenarios can be found in "Fire performance of electric Cables—New test methods and measurement techniques", final report of the European Commission (SMT4-CT96-2059), ISBN 0953231259.

The cables are classified in different classes (according to the classification table published in the Official Journal of the European Union, published Apr. 11, 2006: Commission Decision of 27 Oct. 2006 amending Decision 2000/147/EC implementing Council Directive 89/106/EEC as regards the classification of the reaction-to-fire performance of construction products), which are:

Class A:
 Class A relates to the criteria for class A1 for linings.
Class B:
 Class B characterizes all products that show a non-continuing flame spread in neither the horizontal reference scenario nor the vertical reference scenario for any ignition sources 40-100-300 kW. They should also show limited heat release rate (HRR). This applies also for the 30 kW test exposure in $FIPEC_{20}$ Scenario 2 as well as for the (less severe) 20 kW test exposure in $FIPEC_{20}$ Scenario 1.

Class C:
 Class C characterizes all products that show a non-continuing flame spread when exposed to 40 to 100 kW ignition source in the horizontal reference scenario and a non-continuing flame spread, a limited fire growth rate (FIGRA), and limited HRR when exposed to the 20 kW test procedure, $FIPEC_{20}$ Scenario 1.
Class D:
 Class D characterizes all products that show a fire performance better than ordinary not flame retardant treated polyethylene and a performance approximately like wood when tested in the reference scenarios. When tested in $FIPEC_{20}$ Scenario 1 the products show a continuous flame spread, a moderate FIGRA, and a moderate HRR.
Class E:
 Class E characterizes all products that show a non-continuous flame spread when a single cable is vertically exposed to a 1 kW ignition source. The small flame test already proposed by industry is used (EN 60332-1-2).

In the present invention, it is preferred that the cable comprising the inventive flame retardant polymer composition fulfils the requirements of class D, even more preferred is that the cable fulfils the requirements of class C or even more preferred of class $B_2$.

The cable preferably has a fire growth rate (FIGRA) index equal to or less than 150 W/s, more preferably of less than 135 W/s, most preferably of less than 100 W/s, measured according to $FIPEC_{20}$ Scenario 1.

The peak heat release rate (PHRR) preferably is equal to or less than 150 kW, more preferably of less than 140 kW, most preferably less than 100 kW, measured according to $FIPEC_{20}$, Scenario 1.

It is also preferred that the total heat release ($THR_{1200s}$) is equal to or less than 70 MJ, more preferred less than 60 MJ, most preferred less than 50 MJ, measured according to $FIPEC_{20}$, Scenario 1.

Further, the flame spread (FS) is preferably less than 2 m, most preferably less than 1.75 m, measured according to $FIPEC_{20}$, Scenario 1.

The cables may be produced by any method known in the art. Most commonly the insulated conductors are produced separately as they need to be twisted (in general the cables consist of many—most commonly 3 insulated conductors, wherein the insulation layers have different colours). The insulated conductors are twisted together in a separate production step. The twisted parts are then coated by an extruded bedding layer, which commonly directly is coated with the extruded sheath. It might also happen that this is done in two step, probably due to that the producer is lacking modern equipment. In order to avoid the bedding to stick to its surrounding layers talcum is often "powdered" onto the insulated conductors and bedding layers just before the bedding and sheathing extrusion step.

The cable preferably is a low voltage cable, used as e.g. control or a telecommunication cable.

The present invention is further illustrated by means of the following examples.

EXAMPLES

1. Measurement Methods
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polyethylene is determined at a temperature of 190° C. and a load of 2.16 kg.

b) Density

The density is measured according to ISO 1183 on compression moulded specimens.

c) Comonomer Content

Comonomer content (wt. %) was determined in a known manner based on Fourier transform infrared spectroscopy (FTIR) determination calibrated with $^{13}$C-NMR. All FTIR methods were run by FTIR a Perkin Elmer 2000, 1 scan, resolution 4 cm$^{1}$. The peak for the comonomer was compared to the peak of polyethylene (e.g. the peak for butyl acrylate at 3450 cm$^{-1}$ was compared to the peak of polyethylene at 2020 cm$^{-1}$ and the peak for silane at 945 was compared to the peak of polyethylene at 2665 cm$^{-1}$. The calibration with $^{13}$C-NMR is effected in a conventional manner which is well documented in the literature. Such calibrations are evident for a skilled person. As a reference for calibration, reference is made to Haslam J, Willis H A, Squirrel DC., "Identification and analysis of plastics", $2^{nd}$ Edition, London, Iliffe Books, 1972. The weight-% was converted to mol-% by calculation.

The content of polar comonomer units can also be analyzed by NMR, which gives corresponding results as Comonomer Content (NMR). The comonomer content was determined by using $^{13}$C-NMR. The $^{13}$C-NMR spectra were recorded on Bruker 400 MHz spectrometer at 130° C. from samples dissolved in 1,2,4-trichlorobenzene/benzene-d6 (90/10 w/w).

An alternative method to determine comonomer content (e.g. maleic anhydride, silane and polar comonomer units) is to use NMR-method which would give equal results to the above X-ray and FTIR method, i.e. results would be comparable to the purposes of the invention.

d) Specific Surface Area (BET) of Aluminum Hydroxide

The specific surface area (BET) of aluminum hydroxide was determined according to ISO 9277.

e) Determination of Limited Oxygen Index (LOI)

LOI was determined using a Ceast Flammability Unit by US standard ASTM D 2863-9 and the ISO 4589-2. The LOI results are based on approximately 3 test specimens of dimension "150×6 mm". These are stamped out from a 3 mm thick plate pressed in a Collins press (low pressure (20 bar) at 10° C. during one minute followed by high pressure (300 bar) during five minutes at the same temperature). Cooling rate was 10° C./minute under high pressure.

LOI is measure of the minimum oxygen concentration of an $O_2/N_2$ mixture required to sustain combustion for a minimum of 3 minutes or not propagate more than 5 cm from the top of test specimen. LOI is a measure of ease of extinction.

f) FIPEC$_{20}$ Scenario 1

The cables were tested according to prEN50399:2007-2-1 (FIPEC$_{20}$ Scenario 1) test specifications. The cable mounting was determined by the overall cable diameter. The mounted cable ladder was exposed to the 20 kW burner for 20 minutes as specified. In this test the fire growth rate (FIGRA), the peak heat release rate (PHRR), the total heat release (THR) and the flame spread (FS) were determined, as defined in prEN50399.

The fire classification is done according to the classification table published in the Official Journal of the European Union, published Apr. 11, 2006: Commission Decision of 27 Oct. 2006 amending Decision 2000/147/EC implementing Council Directive 89/106/EEC as regards the classification of the reaction-to-fire performance of construction products), g) Tensile Properties Tensile properties (tensile strength and elongation at break) were determined according to ISO 527-2. Compression moulded specimens of type 1A were used, which were prepared according to ISO 1872-2B.

For the preparation of the compression moulded plaques, the compounds described in section 4 below were firstly extruded into thin tapes using a Brabender Plasti-corder extruder with a film nozzle. The tape had a thickness of 1.5 mm. The temperature profile used was 150/160/170° C. The extruder speed was 50 rpm.

The extruded tapes were used as material for the compression moulding of plaques of the materials described in section 4. The tapes were stacked in a frame. The thickness of the plaques was 2 mm. The compounds (tapes) were pressed into plaques in a Collin press at 200 bar at a temperature of 170° C. during five minutes. Cooling rate was 15° C./minute under high pressure.

The direction of the test pieces was parallel to the original orientation of the extruded tapes. The elongation at break and tensile strength was conducted at 23° C. temperature with an elongation rate of 50 mm/min.

2. Compounding of Compositions

Flame retardant polymer compositions according to the invention and for comparative purpose were produced by mixing together the components in a BUSS-co-kneader at a temperature of 150° C. The "Screw" speed was 30 rpm.

3. Production of Cables 0.7±0.1 mm insulation layer was extruded onto 1.5 mm2 copper conductor on a Francis Shaw 60 mm/24D wire line. Three cores were twisted together by the use of a Northampton Twister. The bedding (Extruder: Maillefer 45 mm/30 D) and sheathed (Extruder Mapre 60 mm/24D) layers were applied by a tandem extrusion process. In order to avoid adhesion between the bedding and its surrounding layers talcum were "powdered" onto the cores and bedding layer just prior the bedding and sheath layer were applied.

As insulation a commercial compound intended for wire & cable applications and all produced by Borealis Technology Oy was used.

LE4423 is an insulation for cable applications which is a silane-crosslinkable polyethylene according to Borealis' Visico® technology which has a MFR (2.16, 190° C.) of 1.0 g/10 min and a density of 923 kg/m3.

As bedding compound a commercial compound from Melos GmbH was used: FR4890.

The sheathing layers used are the respective ones mentioned in section 4.

The overall cable diameter was 9.3±0.1 mm.

4. Compositions

Inventive Example 1 (Ex1)

25.4 wt. % ethylene methyl acrylate (EMA) copolymer Elvaloy 1125 AC having a methyl acrylate content of 25 wt. %, density of 944 kg/m$^3$, MFR$_2$=0.4 g/10 min (commercially available from DuPont)

4.0 wt. % maleic anhydride (MAH) grafted LLDPE Fusabond E MB226D having a high MAH graft level, density of 930 kg/m$^3$, MFR$_2$=1.5 g/10 min (commercially available from DuPont)

10.4 wt. % of HDPE FL5580, density 958 kg/m$^3$, MFR$_2$=1.2 g/10 min (commercially available from Borealis)

60 wt. % of aluminum hydroxide Martinal OL 104 LE having a specific surface area of 3-5 m$^2$/g (commercially available from Albemarle)

0.2 wt. % Irganox 1010 (commercially available from Ciba Speciality Chemicals)

Inventive Example 2 (Ex2)

25.4 wt. % ethylene methyl acrylate (EMA) copolymer Elvaloy 1125 AC having a methyl acrylate content of 25 wt. %, density of 944 kg/m³, MFR₂=0.4 g/10 min (commercially available from DuPont)

4.0 wt. % random terpolymer of ethylene, methyl acrylate and maleic anhydride LOTADER 3430 having a methyl acrylate content of 15 wt. %, a maleic anhydride content of 3.1 wt. %, density of 940 kg/m³, MFR₂=6 g/10 min (commercially available from Arkema)

10.4 wt. % of HDPE FL5580, density 958 kg/m³, MFR₂=1.2 g/10 min (commercially available from Borealis)

60 wt. % of aluminum hydroxide Martinal OL 104 LE having a specific surface area of 3-5 m²/g (commercially available from Albemarle)

0.2 wt. % Irganox 1010 (commercially available from Ciba Speciality Chemicals)

Comparative Example 1 (CE1)

25.4 wt. % ethylene methyl acrylate (EMA) copolymer Elvaloy 1125AC having a methyl acrylate content of 25 wt. %, density of 944 kg/m³, MFR₂=0.4 g/10 min (commercially available from DuPont)

4.0 wt. % maleic anhydride (MAH) grafted MDPE ME0420 having a MAH graft level of 0.5 wt. %, density of 934 kg/m³, MFR₂=1.3 g/10 min (commercially available from Borealis)

10.4 wt. % of HDPE, density 958 kg/m³, MFR₂=1.2 g/10 min (commercially available from Borealis)

60 wt. % of aluminum hydroxide Martinal OL 104 LE having a specific surface area of 3-5 m²/g (commercially available from Albemarle)

0.2 wt. % Irganox 1010 (commercially available from Ciba Speciality Chemicals)

Comparative Example 2 (CE2)

29.4 wt. % ethylene methyl acrylate (EMA) copolymer Elvaloy 1125AC having a methyl acrylate content of 25 wt. %, density of 944 kg/m³, MFR₂=0.4 g/10 min (commercially available from DuPont)

10.4 wt. % of HDPE, density 958 kg/m³, MFR₂=1.2 g/10 min (commercially available from Borealis)

60 wt. % of aminosilane coated aluminum hydroxide Martinal OL 104 I having a specific surface area of 4 m²/g, measured before coating (commercially available from Albemarle)

0.2 wt. % Irganox 1010 (commercially available from Ciba Speciality Chemicals)

5. Results

In Table 1 the results of the LOI and tensile properties determination on test specimens of the inventive polymer compositions Ex1-Ex2 and comparative polymer composition CE1, prepared as described above, and the results of flame retardancy test of the cables comprising a jacket made of polymer compositions Ex1-Ex2 and CE1-CE2 according to the FIPEC₂₀ Scenario 1 are listed.

The cables based on the inventive jacket in minimum fulfill the requirements of class D cables. They prove a flame retardancy performance which is comparable to that of Comparative Example CE2 including an aminosilane coated aluminum trihydroxide filler by providing good mechanical properties. Thus, especially inventive example Ex1 provides a cost-efficient alternative solution to CE2.

TABLE 1

Flame retardancy performance, LOI and mechanical properties

|  | Ex 1 | Ex 2 | CE 1 | CE 2 |
|---|---|---|---|---|
| FIPEC₂₀ Scenario 1 | | | | |
| FIGRA [W/s] | 59 | 131 | 174 | 50 |
| PHRR [kW] | 18 | 136 | 165 | 20 |
| THR [MJ] | 7 | 69 | 75 | 11 |
| Flame Spread [m] | 0.66 | Total | Total | 1.86 |
| Class | B2 | D | E | B2 |
| LOI [%] | 34.5 | 32.5 | 33.0 | n.d. |
| Mechanical properties | | | | |
| Tensile Strength [MPa] | 17 | 13 | 14 | n.d. |
| Elongation at break [%] | 176 | 160 | 188 | n.d. |

Total = flame spread over the total length of the cable on the test rig.
n.d. = not determined

The invention claimed is:

1. A flame retardant polymer composition comprising
   (A) an ethylene methacrylate copolymer,
   (B) uncoated aluminum hydroxide as inorganic filler, and
   (C) an ethylene copolymer comprising maleic anhydride units in an amount of 0.6 to 5 wt. %.

2. The flame retardant polymer composition of claim 1, wherein component (C) is present in the flame retardant polymer composition in an amount of up to 15 wt. % of the flame retardant polymer composition.

3. The flame retardant polymer composition of claim 1, wherein component (C) has a density of not more than 960 kg/m³.

4. The flame retardant polymer composition of claim 1, wherein component (C) has a melt flow rate MFR₂ (190° C., 2.16 kg) of 0.1 to 10 g/10 min.

5. The flame retardant polymer composition of claim 1, wherein the amount of methacrylate comonomer units in component (A) is from 10 to 40 wt. % of the total amount of monomer units in component (A).

6. The flame retardant polymer composition of claim 1, wherein component (A) is present in the flame retardant composition in an amount of 10 to 50 wt. % of the flame retardant polymer composition.

7. The flame retardant polymer composition of claim 1, wherein component (B) is present in the flame retardant composition in an amount of 40 to 70 wt. % of the flame retardant polymer composition.

8. The flame retardant polymer composition of claim 1, wherein the aluminum hydroxide in component (B) has a specific surface area (BET) of equal or more than 3.0 m²/g.

9. The flame retardant polymer composition of claim 1 comprising
   (D) an additional polymer selected from the group consisting of polyolefins, polyesters, polyethers, polyurethanes, elastomeric polymers, and silane-crosslinkable polymers or mixtures thereof in a total amount of up to 25 wt. % of the total composition.

10. The flame retardant polymer composition of claim 1 fulfilling the requirements of class D of the FIPEC test according to prEN 50399:2007 when being used as a layer in a cable.

11. An article comprising the flame retardant polymer composition of claim 1.

12. The article of claim 11 being a wire or cable comprising a layer made of the flame retardant composition of claim 1.

* * * * *